(No Model.) 4 Sheets—Sheet 2.

S. P. STEEN, Jr.
PUNCHING AND EYELETING MACHINE.

No. 585,835. Patented July 6, 1897.

WITNESSES:
Chas. C. Collier.
Geo. A. Vaillant.

INVENTOR:
Samuel P. Steen Jr.
By Chas. B. Collier
Atty.

(No Model.) 4 Sheets—Sheet 3.

S. P. STEEN, Jr.
PUNCHING AND EYELETING MACHINE.

No. 585,835. Patented July 6, 1897.

WITNESSES:
Chas. C. Collier.
Geo. A. Vaillant.

INVENTOR:
Samuel P. Steen Jr.
By Chas. B. Collier,
Atty.

(No Model.) 4 Sheets—Sheet 4.

S. P. STEEN, Jr.
PUNCHING AND EYELETING MACHINE.

No. 585,835. Patented July 6, 1897.

WITNESSES:
Chas. C. Collier.
Geo. A. Vaillant.

INVENTOR:
Samuel P. Steen Jr.
By Chas. B. Collier,
Atty.

UNITED STATES PATENT OFFICE.

SAMUEL P. STEEN, JR., OF PHILADELPHIA, PENNSYLVANIA.

PUNCHING AND EYELETING MACHINE.

SPECIFICATION forming part of Letters Patent No. 585,835, dated July 6, 1897.

Application filed February 25, 1896. Serial No. 580,652. (No model.)

*To all whom it may concern:*

Be it known that I, SAMUEL P. STEEN, Jr., a citizen of the United States, residing at Philadelphia, in the county of Philadelphia and State of Pennsylvania, have invented certain new and useful Improvements in Punching and Eyeleting Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to punching and eyeleting machines, the object being to provide a device, simple in construction and positive and certain in action, which will punch the material and set the eyelets therein at one operation or cycle of the machine without requiring the attention of a skilled operator. I employ a suitably-supported table for holding the material to be punched, a U-shaped frame adapted to slide back and forth on the table, carrying a punch-block, a punch and an upsetting-tool above the punch-block, and an eyeleting-plunger below the same. A toggle and hammer for operating the punch and upsetting-tool or the top-set are carried above the sliding frame in position to depress the said punch or the top-set as one or the other is brought thereunder during the to-and-fro movement of the frame.

The machine also comprises improved means for feeding the eyelets to the eyeleting-plunger, means for operating the toggle and sliding frame, and various other features more fully hereinafter described, and set forth in the claims.

The nature of my improvements and the manner in which they are to be carried out will be fully understood, reference being had to the accompanying drawings.

A C-shaped double housing A is supported by and securely bolted to two supporting-frames, flanged at their upper extremities, forming pedestal A' A'. Upon the housing A and forming part thereof are two bearings B B for the reception of the main shaft C, which lies horizontally and transversely across the entire machine. On its right extremity, looking from the front of the machine, the shaft C carries the driving-pulley D, mounted upon a bushing D', and securely held thereon by means of a set-screw $D^2$ or otherwise. The bushing D' projects beyond the inner hub of the driving-pulley, said projecting part being cut with ratchet-teeth $D^3$ on its periphery, said ratchet-teeth pointing in the direction of rotation. The bushing and pulley rotate loosely upon the shaft and are held in place laterally by means of the washer $D^4$ and bolt $D^5$ in the usual manner.

Adjacent to the ratcheted bushing is a disk E, securely fastened to or forming part of the shaft C. On its outer face, or that adjacent to the ratchet-bushing, the disk E carries a pawl E', engaging with the said ratchet and pressed against the same by means of the spring E².

The pawl E' is mounted rigidly upon a pivotal pin E³, near the periphery of the disk E, having its bearing in the said disk, and carrying on its other extremity, projecting beyond the inner face of the disk, an arm E⁴, rigidly connected to the said pivotal pin, and whose vibrating end projects when the pawl is engaged in the ratchet beyond the periphery of the disk, say about one-half inch.

Upon a stud E⁵, beneath and on the plane of vibration of the arm E⁴, secured in a lug A³, cast on the right-hand side of the housing A, swings a bell-crank lever E⁶, of which the vertical arm extends upward to a point on a level with the lowest point of the periphery of the disk E, so as to be in the path of rotation of the projecting extremity of the arm E⁴, previously described, so as to trip the latter and thereby raise the pawl E' free of the ratchet-teeth D³ and stop the machine whenever the rotation of the disk E brings the said arm E⁴ in contact with the vertical arm of the bell-crank lever E⁶. The horizontal arm of the bell-crank lever E⁶ extends inwardly through a slot A⁴, provided therefor in the housing A, and its extremity is seated in the bifurcated end of a connecting-rod E⁷, to which it is secured by means of the pin or bolt E⁸, passing through the two, but allowing hinge motion. The lower extremity of the connecting-rod is likewise bifurcated and straddles the treadle-bar E⁹, to which it is likewise secured by means of a pin or bolt E¹⁰ at a suitable distance from the point of suspension E¹¹ of the said treadle-bar E⁹. The entire system—bar E⁹, rod E⁷, and bell-crank lever E⁶—being held up in its normal position when the machine is disconnected from the motive power by the spring E¹², it will be seen that the depression of the treadle-bar pulls down the connecting-rod and horizontal arm of the bell-crank lever, thereby retracting the vertical arm of the latter out of the path of the arm E⁴, so that the pawl E' shall not be disengaged from the ratchet D³. It follows that the machine will remain in operation so long as the treadle remains depressed and will stop at the end of the revolution during which the foot is removed.

Between the bearings B B the shaft C is bent so as to form a crank or eccentric with a full stroke of, say, about three inches, imparting vibrations to a connecting-rod F, which is strapped upon it by means of a strap F' and bolts F² F². The extremity of the connecting-rod extends forward, so that an eye at its point when at the middle of its travel shall be in the same vertical transverse plane as the axial bolt of the suspension F³ of two links F⁴ F⁴ on each side of the overhanging head of the housing A and at a distance of, say, two inches beneath the said axial bolt, that being the length of the links from center to center of eyes. Between the links F⁴ F⁴ and the connecting-rod F two additional links F⁵ F⁵, one on each side of the connecting-rod and of similar length to the links F⁴ F⁴, are secured to the former and to the latter by means of a bolt F⁶, which traverses the five members—to wit, the two outside links F⁴ F⁴, the inner links F⁵ F⁵, and the extremity of the connecting-rod F in the center—through eyes provided in the same. The lower extremities of the links F⁵ F⁵ are united in the same manner by means of a through-bolt F⁷ to each side of a vertically-swinging hammer-headed lever F⁸, bifurcated at its rear end, so as to straddle the double housing A, to which it is secured pivotally on the outside by means of the horizontal through-bolt F⁹.

Figures 1, 18:
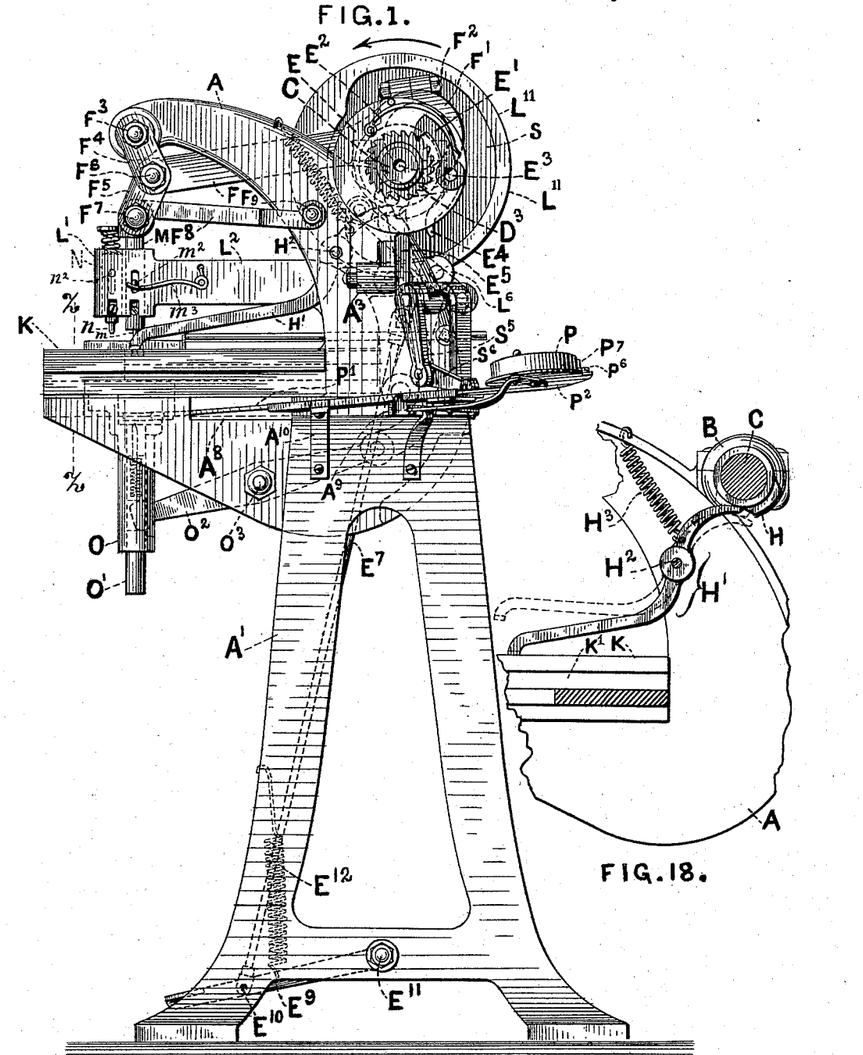
Figure 1, Sheet 1, is a side elevation of my invention, the driving-pulley being removed, with some parts shown in dotted lines and others omitted to avoid confusion.
Fig. 18, Sheet 1, is a vertical section through line $x\ x$ of Fig. 2, looking from the right-hand side and showing the presser-foot with actuating cam and spring.

The above arrangement of the links F⁴ F⁴ F⁵ F⁵ and lever F⁸, suspended from the overhanging of the housing, constitutes a toggle-joint which, in connection with the movement of the eccentric and eccentric-rod, imparts an isochronous upward and downward movement of the hammer-lever F⁸ twice in every revolution of the main shaft, to be hereinafter more fully set forth. Adjacent to the eccentric and between it and its left-hand bearing (the right and left hand throughout this specification being taken as looking from the front or side at which the operator stands or sits) a cam H (see Fig. 18, Sheet 1) is built up upon the shaft C, whose function is to depress for a brief period of each revolution the rear end of a rock-lever H', pivoted upon the spindle H², secured in the housing A. The forward end of the rock-lever, which is bifurcated, extends to each side of the eyeleting-plungers at a suitable distance therefrom, and when depressed by the action of the spring H³ constitutes a presser-foot for holding the work in place upon the working-plate table K. The cam H is so timed that it shall depress the rear end of the presser-foot immediately after the eyeleting of each sheet is completed and release or leave same, say, sixty degrees of a revolution later, so as to allow sufficient time for removing and replacing the work before the descent of the punching-plunger.

Figures 2, 3, 15, 16, 17:
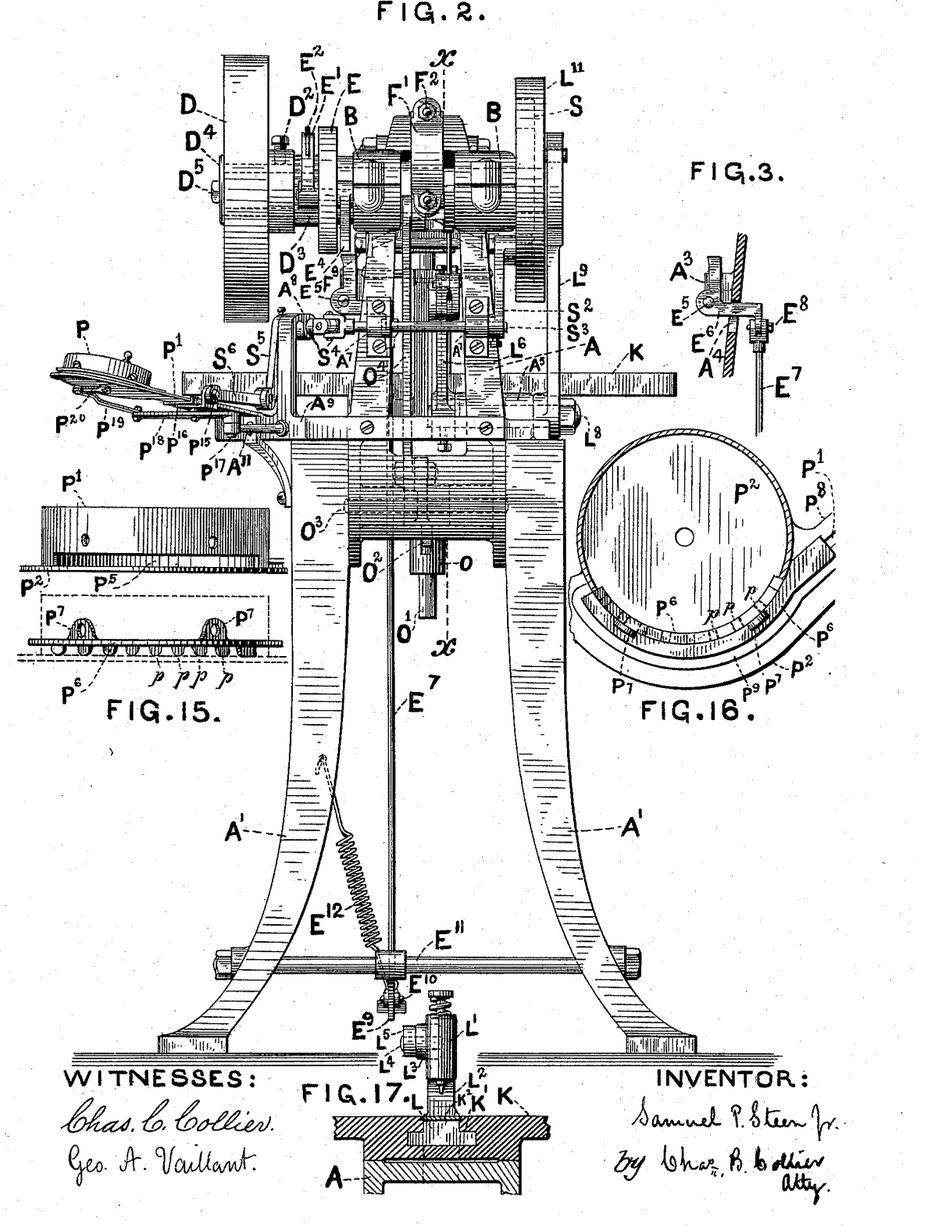
Fig. 2, Sheet 2, is a rear elevation.
Fig. 3, Sheet 2, is a detail of part of the starting device.
Fig. 15, Sheet 2, is a side view of the eyelet-magazine box and gate separated.
Fig. 16, Sheet 2, is a top view of same with the bottom part of the eyelet-magazine in section.
Fig. 17, Sheet 2, is a transverse section through line $z\ z$ of Fig. 1, showing the central part of the plane table resting upon the lower part of the housing.

The working-plane table K, Fig. 17, Sheet 2, upon which the work to be eyeleted is laid, consists of a plate, say, twelve by twenty-four inches long and about one and a half or two inches thick at the center and one inch at the sides, perfectly plane on its upper face, and reposing horizontally and secured rigidly to the underhang of the housing A. An inverted-T-shaped channel K' traverses it centrally from front to back and serves as a guide for the plunger-carrier L, which is fitted to slide backward and forward in the said channel, its base being cast and finished to conform with the inverted-T-shaped channel in plate K.

Figures 5, 6:
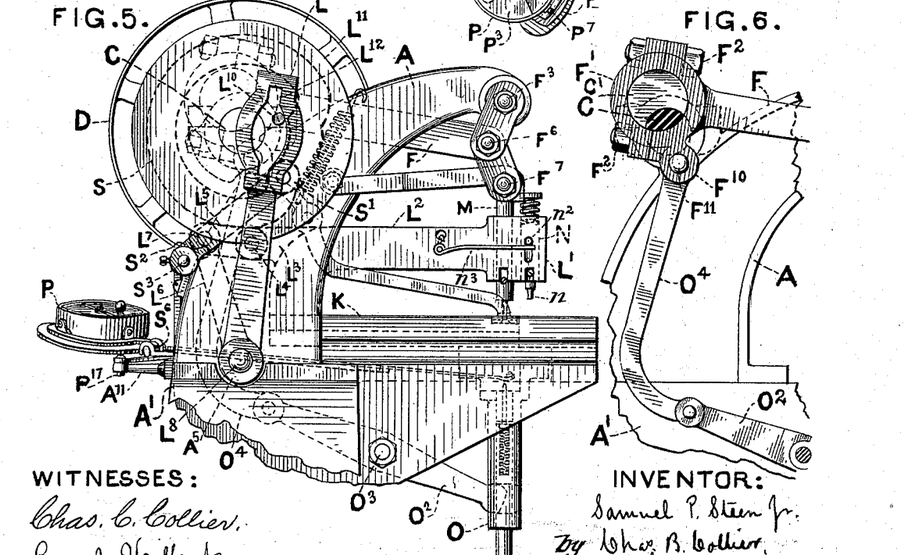
Fig. 5, Sheet 3, is a side elevation of part of the machine from the side opposite to that indicated in Fig. 1.
Fig. 6, Sheet 3, is a detailed section through line $x\ x$ of Fig. 2, showing the main crank or eccentric and strap and also the mode of attachment and parts of connecting-rods hidden or imperfectly shown in other views.

The open space in front and in the rear of the axial line of the toggle-joint movement is covered over with a thin plate of steel K², dovetailed into the plate, the front one being easily retracted by the hand of the operator when access is required to the working parts beneath. This plunger-carrier L is constructed with an overhanging head L' at the extremity of a horizontal arm $L^2$, projecting, first, vertically and then horizontally from the sliding base. Upon the back of the arm $L^2$ is a lug $L^3$, (shown in dotted lines, Fig. 5, Sheet 3,) bored out and tapped to receive a stud $L^4$, over which fits a link $L^5$, suitably bored at both ends, connecting it to the extremity of the lever $L^6$, provided with a laterally-extending stud $L^7$, similar to that upon the lug $L^3$, said stud fitting in the link $L^5$ aforesaid. The lever $L^6$ is secured firmly by means of a set-screw upon the end of the pivotal shaft $L^8$ on the inner side of the bearing $A^5$ of the said shaft $L^8$, so that the said lever $L^6$ is vibrated in unison with and by the lever $L^9$, securely screwed or keyed upon the outer extremity of the said shaft $L^8$.

The lever $L^9$ is vibrated by means of a pin $L^{10}$ upon the outer face of the cam-disk $L^{11}$, keyed or otherwise secured upon the main shaft C and rotating therewith. The laterally-projecting pin $L^{10}$ engages in a slot $L^{12}$, extending longitudinally and centrally in the upper end of the said lever $L^9$. The slot $L^{12}$ is not rectilineal, as in that case the reciprocation of the lever by means of the pin $L^{10}$ would be continuous; but it is hollowed out laterally on both sides for a portion of its length with a radius equal to the distance of the outer periphery of the pin from the center of rotation of the shaft. It follows that while the pin is traversing that portion of the slot which is curvilinear the lever remains motionless. This of course occurs at the extremity of each vibration, the lever being vibrated backward or forward only when the pin engages in the rectilineal portions of the slot, either above or below.

The overhanging head L' of the plunger-carrier L is bored vertically with two holes parallel to each other and on the same vertical plane, one in front of the other and at a distance from center to center equal to the length of the travel imparted to the plunger-carrier by the disk $L^{11}$ and pin $L^{10}$, through the slotted lever $L^9$, pivotal shaft $L^8$, lever $L^6$, and link $L^5$, as hereinabove described. The longitudinal position of these holes is such, relatively to the rest of the machine, that the inner one, or the one farthest from the operator, shall be concentric with the central vertical line passing through the toggle-joint mechanism, which is indeed the central working axis of the machine when the plunger-carrier is in its extreme forward position, and that the front plunger shall be in a similar position when the carrier is at its rearmost position. Within these holes, serving as guides, slide the two plungers M N, the former carrying the punching-nib $m$ and the latter the upsetting-nib $n$. These nibs are held in place by means of set-screws, Fig. 11, Sheet 4, $m'$ $n'$, respectively, the plunger-carrier head being slotted at the side (see Fig. 10) for facilitating the loosening of the same when it is desirable to change the nibs for a different size. Both plungers are provided at or near their center with laterally-projecting pins $m^2$ $n^2$, respectively, Figs. 1 and 5, which protrude to the outside of the carrier-head through slots provided for that purpose, one on each side of the carrier-head, said pins to serve as abutments for the springs $m^3$ $n^3$, attached to each side of the carrier-arm, respectively, for maintaining the plungers normally in their upper position and also as stops when they reach the top of their respective slots to prevent the plungers from being displaced or pushed too high, the height of the top of said slots being such that the top of the plungers when at their highest position shall be clear of the under side of the hammer-head of the lever $F^8$ at the time when they are shifted, one from and the other to the central axial position beneath said hammer-head.

It can be clearly understood from the above that the position of the pin $L^{10}$ upon the disk $L^{11}$ relatively to the main eccentric must be such that the carrier shall be stationary while the hammer-head is depressed below the level of the top of either of the said plungers.

The plunger M merely consists of the body of the plunger, which is bored from the lower end for a portion of its length for the reception of the head of the punching-nib $m$, which is adjusted and secured in place by means of the set-screw $m'$, as hereinbefore stated, and needs no further description. A similar arrangement may be effected for the plunger N, but I prefer to construct the latter differently in view of the fact that in some instances the character of the work is frequently changed either in the number of sheets to be eyeleted together or in the thickness of the material to be operated upon, which in either case would require a separate adjustment of the eyeleting-nib, and this would not be necessary in the punching-nib, as said nib is sufficiently long to adapt itself to varying thicknesses within certain limits, or foreign matter may get under the material, or through carelessness of the operator more than the proper number of sheets may be placed beneath the nib, which might result in damage to the work, the machine, or to the nib itself.

Figures 10, 11, 12, 13:
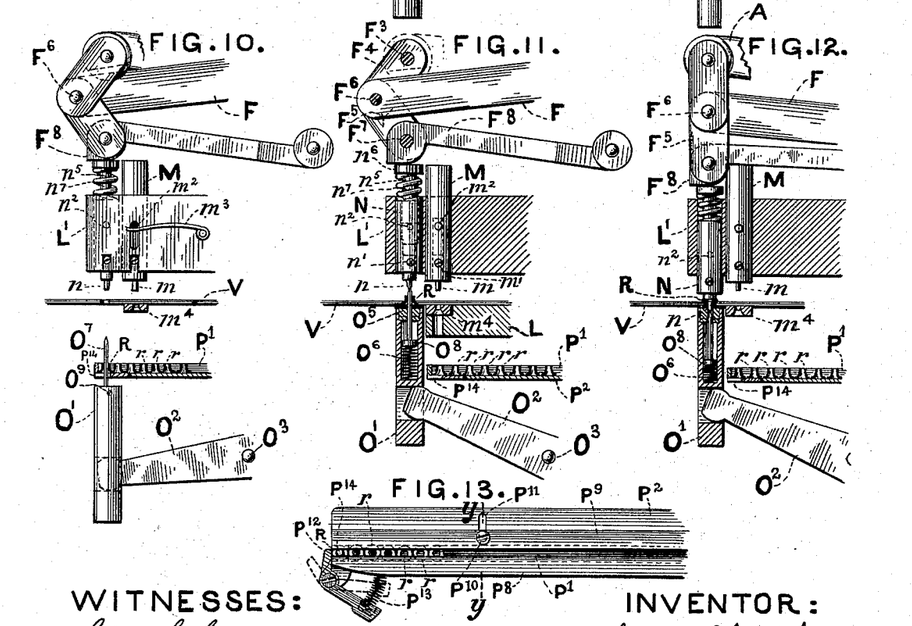
Fig. 13, Sheet 4, is a plan view of the delivering end of the eyelet-run, also on an enlarged scale.
Figure 14:
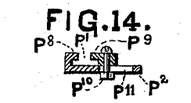
Fig. 14, Sheet 4, is a transverse section through line $y\ y$ of Fig. 13.

In order to obviate the possibility of such an accident, I bore the plunger N clear through from end to end, setting and adjusting the nib approximately in its proper place and tightening the set-screw $n'$, as in the case of the plunger $n$, but in the upper part I insert a stem $n^5$, Fig. 11, fitting easily and sliding freely in the bore and leaving sufficient clearance between its bottom and the top of the nib-head to avoid the possibility of their coming in contact. The upper part of the stem is terminated with a disk-shaped head $n^6$ of larger diameter than the stem. Between this head and the top of the plunger I interpose a spring $n^7$ of sufficient stiffness to suffice for upsetting the eyelet when the pressure is applied to it through the stem-head $n^6$, the said spring $n^7$, the plunger, and upsetting-nib $n$. In this manner any variation of thickness within reasonable limits will be taken up by the spring $n^7$ without strain or injury of parts.

Immediately beneath the punching-nib $m$, Fig. 11, so that its top face shall be on a level with the top face of the plane table and concentrically in line with the axial line of the said punching-nib $m$, the punch-die $m^4$ is secured in the jaws of a dovetailed groove upon the base of the plunger-carrier L, where it is held in place by means of a set-screw or otherwise, so as to be easily interchangeable whenever such change is required. Screwed to the under face of the plane table, concentric with the vertical axis of the toggle-joint movement, is the vertical guide-tube O, enlarged into a chamber of sufficient depth, say one inch, and cut away laterally at the top to admit the eyelet-run, hereinafter described, for the delivery of the eyelets. Beneath this chamber or enlargement the tube extends downward vertically, say five inches or thereabout, and serves as a guide for the plunger $O'$, containing the eyelet-pin $O^7$ and anvil $O^5$, whose function is to take the eyelet from the eyelet-run and place it in the eyelet-hole previously punched in the work by the punching-nib $m$ and to serve as an anvil to sustain the pressure of the descending eyeleting-nib $n$ when the eyelet is upset.

The bore of the guide-tube O corresponds with the diameter of the plunger $O'$, which fits and slides easily therein, and the tube O is slotted to admit the front end of the rock-lever $O^2$, vibrating in the central vertical longitudinal plane of the machine and suspended and rocking upon the pivotal horizontal stem $O^3$, rigidly bolted upon the depending ribs of the housing A. The rear end of the rock-lever $O^2$, Fig. 6, Sheet 3, is connected by a pin-joint with the depending end of a connecting-rod $O^4$, which is supported from an ear $F^{10}$, extending from the under side of the eccentric-rod F and to which the said rod $O^4$ is likewise joined by means of a pin $F^{11}$, passing through both members, all connections allowing free vibratory movement in the plane of motion.

Figure 7:
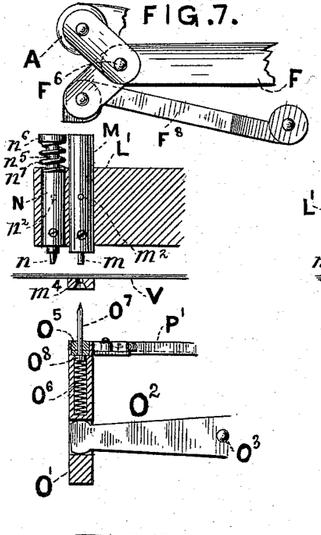
Figs. 7, 8, 9, 10, 11, and 12, Sheet 4, are diagrammatic views and sections on a slightly-enlarged scale, showing the various relative positions of the parts of the machine which directly act upon the eyelets at various stages of the eyeleting process.
Figures 8, 9:
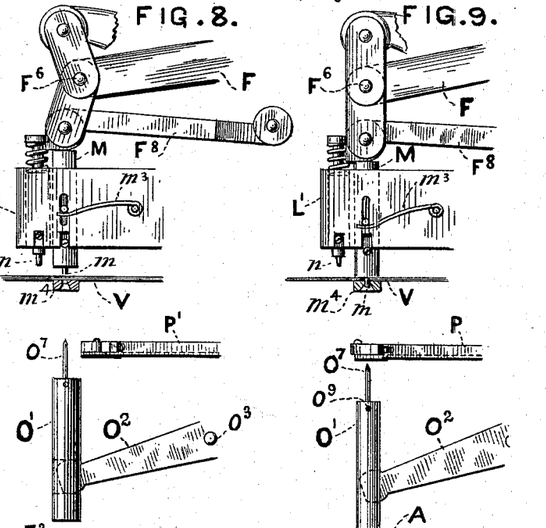

The plunger $O'$ (shown in section, Figs. 7, 11, and 12, Sheet 4) is slotted diametrically and vertically near its lower end for the reception of the forward extremity of the rock-lever $O^2$, by which it is reciprocated. It is bored out vertically from the top to a depth equal to the thickness of the anvil $O^5$, the boring being continued at a reduced diameter, forming a shoulder or seat for the said anvil, to a depth sufficient for the reception of a spring $O^6$ and a needle $O^7$, having a flat disk-shaped head $O^8$. The disk-shaped head fits and slides freely in the reduced bore and rests upon the top of the spring $O^6$, by which it is maintained normally in the upper part of such smaller bore, pressing against the under side of the anvil $O^5$, the latter being held in place by means of a countersunk screw $O^9$ or otherwise.

The anvil $O^5$ is centrally drilled for the reception of the pin or needle $O^7$, which passes through it and to which it serves as a guide.

The eyelet magazine and run consists mainly, first, of a cylindrical box or magazine P for the reception of the eyelets in bulk and, secondly, of a channel or run $P'$ for conveying the said eyelets $r\ r\ r$ from the magazine P to the point of delivery immediately beneath the plane table and in the vertical line of the toggle-joint movement.

Figure 4:
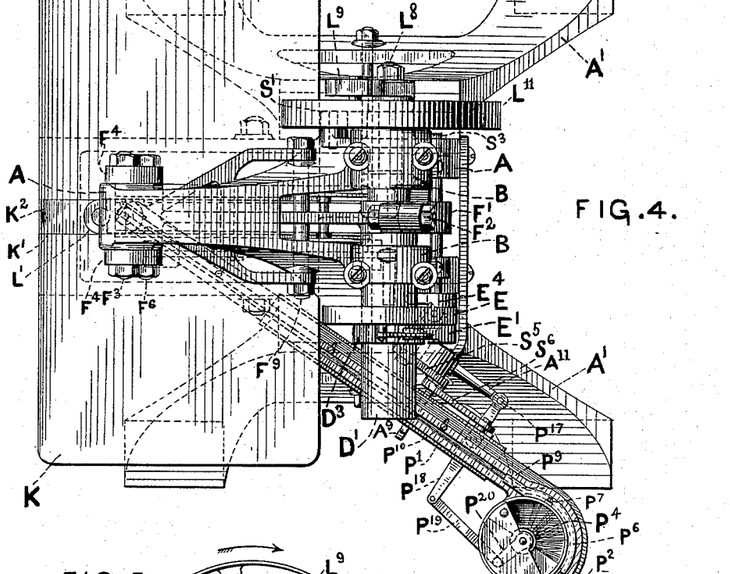
Fig. 4, Sheet 3, is a plan view of the machine without the driving-pulley.

The eyelet-magazine, which is placed at the right of the machine and toward the rear, consists, as before stated, of a cylindrical box of, say, about one inch depth by four in diameter. The bottom $P^2$ of the box extends beyond the box and forms also the bottom of the eyelet-run throughout its entire length. A horizontally-rotating cover $P^3$, Fig. 4, pivoted upon the center part of the box-lid and provided with a thumb-knob, gives access to the interior and closes the box while in operation. A central pivot, which passes through the bottom $P^2$ and is journaled therein, carries a hub $P^4$, from which radiate a series of clusters of bristles extending two-thirds around the said hub, said bristles just barely touching the inner periphery of the magazine-box. The side of the magazine-box nearest to the machine is slotted flush with the bottom $P^2$, with a slot $P^5$, Fig. 15, Sheet 2, sufficiently high to permit the largest eyelets to pass through and of suitable length to admit the rack or gate $P^6$, which is provided with teeth $p\ p\ p$, forming a series of open spaces of the general conformation of an eyelet, in the proper position for entering the run. No eyelet of the required size could pass this gate unless in the proper position—to wit, flange down.

The gate $P^6$ is screwed onto the side of the box by the lugs $P^7 P^7$, so that the toothed portion of the segment extends within the box, as shown in dotted lines, Fig. 16, the bottom of the teeth just touching the bottom plate $P^2$, Fig. 15. Just at this point begins the eyelet run or channel, extending from the eyelet-magazine to a point in the central vertical line of the toggle-joint movement through an opening $A^8$ in one of the depending ribs of the housing A, which presents in section an inverted T, as shown in Fig. 17, Sheet 4, the outer rail or side $P^8$ of the run being permanently fixed to or forming part of the plate $P^2$, but the inner plate $P^9$ or that one toward the machine being adjustable laterally by means of screws and slots $P^{10} P^{11}$, so that eyelets of different sizes may be employed without requiring any change beyond the resetting of the rail according to the size of rivet used and the substituting of another gate $P^6$, a different one being required for every three or four sizes of rivets.

The delivery end of the eyelet-run, Fig. 13,

Sheet 4, is closed by means of a spring-gate P$^{12}$, in the form of a bent lever pivoted upon an extension of the bottom plate and maintained closed by the reaction of the spring P$^{13}$, the position of the bent lever when open being indicated by dotted lines, and the under part of the center of the channel is cut away for the passage of pin O$^7$, as shown at P$^{14}$, Figs. 10, 11, 12, and 13.

The eyelet-magazine and eyelet-run are slightly inclined, so as to facilitate the progress of the eyelets toward their destination, and this is further enhanced by the reciprocating action which is imparted to the entire device to bring its delivery end alternately beneath the vertical center line of the eyeleting-nib and withdrawing it out of the way of the same, during which latter motion the eyelet is removed by the pin O$^7$, which has previously risen from beneath and engaged in the foremost rivet R. The under plate being cut away at this point, there is no impediment presented for the pin to pas through the gate P$^{12}$, carrying the rivet with it. This reciprocation of the eyelet-run longitudinally is effected primarily by means of a cam-groove S, (shown in Fig. 1 and in dotted lines, Figs. 2, 4, and 5, Sheets 2 and 3,) cut on the inner face of the disk L$^2$. Within the said cam-groove runs a friction-roller S', Fig. 5, carried upon a stud in the vibrating lever S$^2$, which is secured rigidly upon the shaft S$^3$, Fig 2, carried in bearings A$^7$ A$^7$ upon the back of the housing A and the bearing A$^8$ upon an extension A$^9$ of the said housing. The shaft S$^3$ extends beyond a universal joint S$^4$ and carries on its outer extremity, keyed or otherwise rigidly fastened thereto, a vibrating lever S$^5$, at the lower end of which, connected by means of a transverse pin, is supported the connecting-hook S$^6$, engaging with a stud P$^{15}$, projecting laterally from the inner side of the trough P$^{16}$, in which the eyelet-run lies, secured by means of a pin or otherwise. This trough P$^{16}$ is reciprocated and slides longitudinally in and is supported on seats provided upon the brackets A$^{10}$ and the extension A$^9$ of the housing A.

Upon the extension A$^9$, extending horizontally in a direction parallel to that of the eyelet-run, is securely fixed a post A$^{11}$, terminating with an eye in which engages the depressing-pin P$^{17}$ on the short arm of a rock-lever P$^{18}$, pivoted on the under side of the eyelet-run trough and connecting its longer arm with a connecting-stem P$^{19}$, said connecting-stem uniting the longer arm of the rock-lever with the lever P$^{20}$ beneath the eyelet-magazine and rigidly mounted upon the spindle of the rotating brush within the said eyelet-magazine, thereby communicating to said brush the reciprocating rotary movement derived from the reciprocations of the eyelet-run system.

The rotations of the brushes in the eyelet-magazine agitate and press the eyelets in different positions against the toothed gate P$^6$, which they cannot pass unless they are in the proper position. It follows that it is merely a question of time when all the eyelets are expelled, keeping the run full continuously without clogging.

The construction of the eyelet-run is such that it is accessible at all times, whether for purposes of cleaning or readjusting the rail, &c., by merely disconnecting the hook connection S$^6$, the pin rising freely out of the eye in the post A$^{11}$. The entire system, eyelet magazine, and run may be lifted and removed from the machine and replaced with equal facility.

It will be observed that all the movements performed by this machine are derived directly or indirectly from cams, cranks, crank-pins, and a gear upon the main driving-shaft. It follows that the only precaution necessary in the construction of such a machine is to time said cams, cranks, crank-pins, &c., in such wise that the parts which they control shall assume the positions relatively to each other shown in the series of diagrammatic views from Figs. 7 to 12, inclusive, in which the said relation is illustrated at various stages of the operation, as hereinafter described.

The operation of my machine is substantially as follows, the proper adjustments having previously been made, to wit: The eyelet-run having been adjusted to the proper width for the eyelet used, the proper gate of the magazine having been put in place, the guide-rule upon the plane table having been secured to the required distance, the card or other article V is placed upon the plane table in the proper position and the treadle is depressed. At the moment of depressing the treadle the parts are in the position shown in Fig. 7, the main eccentric being at its extreme rearward position, the pressure-hammer is at its highest elevation, the two upper plungers M N are at their highest position, held there by the springs $m^3$ $n^3$, the lower plunger O' is at mid-stroke, the carrier forward, bringing the punch and die under the hammer, the eyelet-run is retracted, and the presser-foot (not shown in diagram) is raised, as incated by dotted lines, Fig. 18, Sheet 1. The depressing of the treadle tilts the bell-crank lever E$^5$, throwing the pawl E' in gear with the ratcheted bushing of the driving-pulley, causing the shaft C to rotate with the latter. The crank or eccentric C' upon the shaft C rising, advances and raises the eccentric-rod F, also raising the rear end of the rock-lever O$^2$, thus partially straightening the toggle-joint F$^6$ and forcing the punching-nib down to the top of the card V, simultaneously depressing the eyelet-needle O$^7$ until it is on a level with the top of the eyelet-run. (See Fig. 8.) The pin L$^{10}$ and cam-roller S' being still in the idle part of their path, no change has occurred in the position either of the plunger-carriage or the eyelet-run until the eccentric has just passed its highest point, when the toggle-joint is straightened, driving the punching-nib through the material V, Fig. 9, and lowering the point of the eyelet-pin beneath the eyelet-run, immediately succeeding which the roller $S^5$ is drawn toward the center of the cam, thus drawing the eyelet-run forward, bringing the eyelet R in the path of the eyelet-pin $O^7$.

In Fig. 10 the eccentric-rod has passed its extreme forward position and the toggle-joint has commenced straightening out, the pin $L^{10}$ has pulled back the plunger-carriage, drawing away plunger M and die $M^4$, so as to bring plunger $L'$ beneath the descending hammer $F^8$ and over the eyelet-hole, and the eyelet-needle has risen sufficiently to pass through the open space in the bottom of the eyelet-run and through the eyelet R just at the moment that the eyelet-run is about to slip back.

Fig. 11 shows the eyelet-run slipped back, leaving the eyelet R upon the needle $O^7$, which has carried it to the eyelet-hole and placed it therein, the point of the eyelet-needle abutting against and in a small center cavity in the point of the descending eyeleting-nib and pressed against and into the same by the spring $O^6$ beneath.

At Fig. 12 the main eccentric has reached its lowest point and the toggle-joint is again straight, pressing down the eyeleting-nib upon the eyelet R, which is caught between the eyeleting-nib head and the anvil, the nib transfixing the eyelet and pushing the eyelet-needle down out of the way, thus upsetting the eyelet on the material. The next quarter-revolution brings the parts back into the position shown in Fig. 7 and described hereinabove. The foot having been raised from the treadle in the meantime the rock-arm springs up, drawn by the spring $E^{12}$, and the bell-crank lever $E^6$ comes close to the disk E in the path of the lever $E^4$, which it trips, throwing the pawl $E'$ out of the ratchet and stopping the machine instantly, the main eccentric $C'$ being at its extreme backward position.

The advantages claimed for this machine over former methods and machines are mainly a marked saving in labor, economy of time, and regularity and uniformity of work, the entire process, save the feeding and taking away of work, being automatically performed by the machine itself.

I am aware that machines combining the two functions of punching and eyeleting have already been invented and are known in the art, but by reason of their complex structure and defective organizations such machines have proved very expensive of construction and liable to get out of order. I therefore do not broadly claim such a machine; but What I do claim as my invention, and desire to secure by Letters Patent, is—

1. In an eyeleting-machine, the combination, with the frame, of a table secured thereto, a plunger-carrier adapted to reciprocate horizontally thereon, a punch and a top-set supported by said plunger-carrier and movable therein, a punch-block, also carried by the plunger-carrier, a toggle pivoted to the frame above the plunger-carrier, a hammer-lever also pivoted to the frame and to the lower end of the toggle, and means for operating the toggle to depress, through the medium of the hammer-lever, the punch and top-set when brought thereunder by the reciprocation of the plunger-carrier, substantially as shown and described.

2. In an eyeleting-machine, the combination, with the frame, of a table secured thereto, a plunger-carrier adapted to reciprocate longitudinally thereon, a punch and a top-set carried by said plunger-carrier and movable therein, a punch-block, also carried by the plunger-carrier, a toggle pivoted at its upper end to the frame above the plunger-carrier, a hammer-lever pivoted to the frame and to the lower end of said toggle, a vertically-movable eyelet-plunger below the table in the axial line of the toggle, a reciprocating eyelet-run, and means for operating the various parts, substantially as shown and described.

3. In an eyeleting-machine, in combination with the frame and a table secured thereto, a U-shaped plunger-carrier, one arm of which is adapted to slide on the table at a right angle to the line of movement of the work to be operated upon and carrying a punch-block, the other arm, which extends above and overhangs the table, having a head at the end thereof, a punch and a top-set adapted to slide vertically through openings in the said head, the said punch and top-set being placed one behind the other in the line of movement of the plunger-carrier, and means for reciprocating the plunger-carrier through a space equal to the distance between the axes of the punch and the top-set, the said means having a moment of rest at the end of each reciprocation of the plunger-carrier, substantially as shown and described.

4. In an eyeleting-machine, in combination with the frame and a table secured thereto, a plunger-carrier supporting a punch-block adapted to slide back and forth in a guide on the table, the said plunger-carrier having an overhanging arm and head, a punch and a top-set adapted to slide vertically through openings in the head, the said punch and top-set being placed one behind the other in the line of movement of the plunger-carrier, a toggle, a hammer, means for reciprocating the plunger-carrier through a space equal to the distance between the axes of the punch and the top-set, the said means having a dwell or moment of rest at the end of each reciprocation of the plunger-carrier, and means for operating the toggle to depress either the punch or the top-set during the moment of rest, substantially as shown and described.

5. In an eyeleting-machine, in combination with the frame and a table secured thereto, a horizontally-reciprocating plunger-carrier, a punch and a top-set both adapted to move vertically therein, a punch-block secured to the plunger-carrier beneath the punch, a hammer-lever pivoted to the frame, a toggle also pivoted to the frame and to the hammer-lever, a vertically-moving eyelet-plunger below the table and secured thereto, means for reciprocating the plunger-carrier, and means, such as described, for operating the toggle at the end of each reciprocation of the plunger-carrier, and the eyelet-plunger at the end of each alternate reciprocation, substantially as shown and described.

6. In an eyeleting-machine, the combination of an eyelet magazine and run, mechanism for reciprocating the same in a longitudinal direction, a reciprocating brush within the magazine, an arm secured to the shaft of the brush and a lever connected through a link to the arm, the said lever being pivoted to the frame and to the eyelet-run, whereby the longitudinal reciprocation of the eyelet-run shall impart a rocking motion to the brush, substantially as shown and described.

7. In an eyeleting-machine, the combination of a table, a plunger-carrier sliding thereon, an arm secured to a rock-shaft connected with said plunger-carrier, a second arm secured to the rock-shaft having a slot at its outer end, and a rotating pin engaging with the slot, to vibrate the arm and move the plunger-carrier, a portion of the side wall of the said slot being curved on the same radius as that of the outer surface of the pin, whereby a delay occurs at the end of each reciprocation of the plunger-carrier, substantially as shown and described.

In testimony whereof I have hereunto affixed my name, in the presence of two witnesses, on this 15th day of January, A. D. 1896.

SAMUEL P. STEEN, JR.

Witnesses:
THOS. S. REED,
GEO. W. REED.